United States Patent

[11] 3,624,512

[72] Inventor Wayne Wheeler Evans
Indianapolis, Ind.
[21] Appl. No. 829,403
[22] Filed June 2, 1969
[45] Patented Nov. 30, 1971
[73] Assignee RCA Corporation

[54] AUTOMATIC FREQUENCY CONTROL SYSTEM
5 Claims, 2 Drawing Figs.

[52] U.S. Cl. .......... 325/422, 178/5.8 F
[51] Int. Cl. .......... H04b 1/16
[50] Field of Search .......... 325/422, 418, 420, 421, 423; 178/5.8 F

[56] References Cited

UNITED STATES PATENTS

| | | | |
|---|---|---|---|
| 3,502,988 | 3/1970 | Shelby .......... | 325/422 X |
| 3,519,939 | 7/1970 | Tashima .......... | 325/422 X |
| 3,233,179 | 2/1966 | Klettke .......... | 325/469 |
| 3,499,981 | 3/1970 | Neal .......... | 178/7.3 |

*Primary Examiner*—Robert L. Griffin
*Assistant Examiner*—Kenneth W. Weinstein
*Attorney*—Eugene M. Whitacre

ABSTRACT: A television receiver includes automatic fine-tuning circuits which are coupled to a voltage responsive variable capacitance device in the heterodyne local oscillator resonant circuit to control the oscillator frequency. The automatic fine-tuning circuits include a tunable resonant discriminator circuit and provide an output voltage having a magnitude determined by the frequency deviation of the output signal from the television mixer stage from the resonant frequency of the discriminator circuit. The discriminator circuit is tuned over a band of frequencies by varying the voltage across a voltage-responsive variable capacitance device in the discriminator circuit.

I F BAND PASS CHARACTERISTIC

Figures 1, 2:
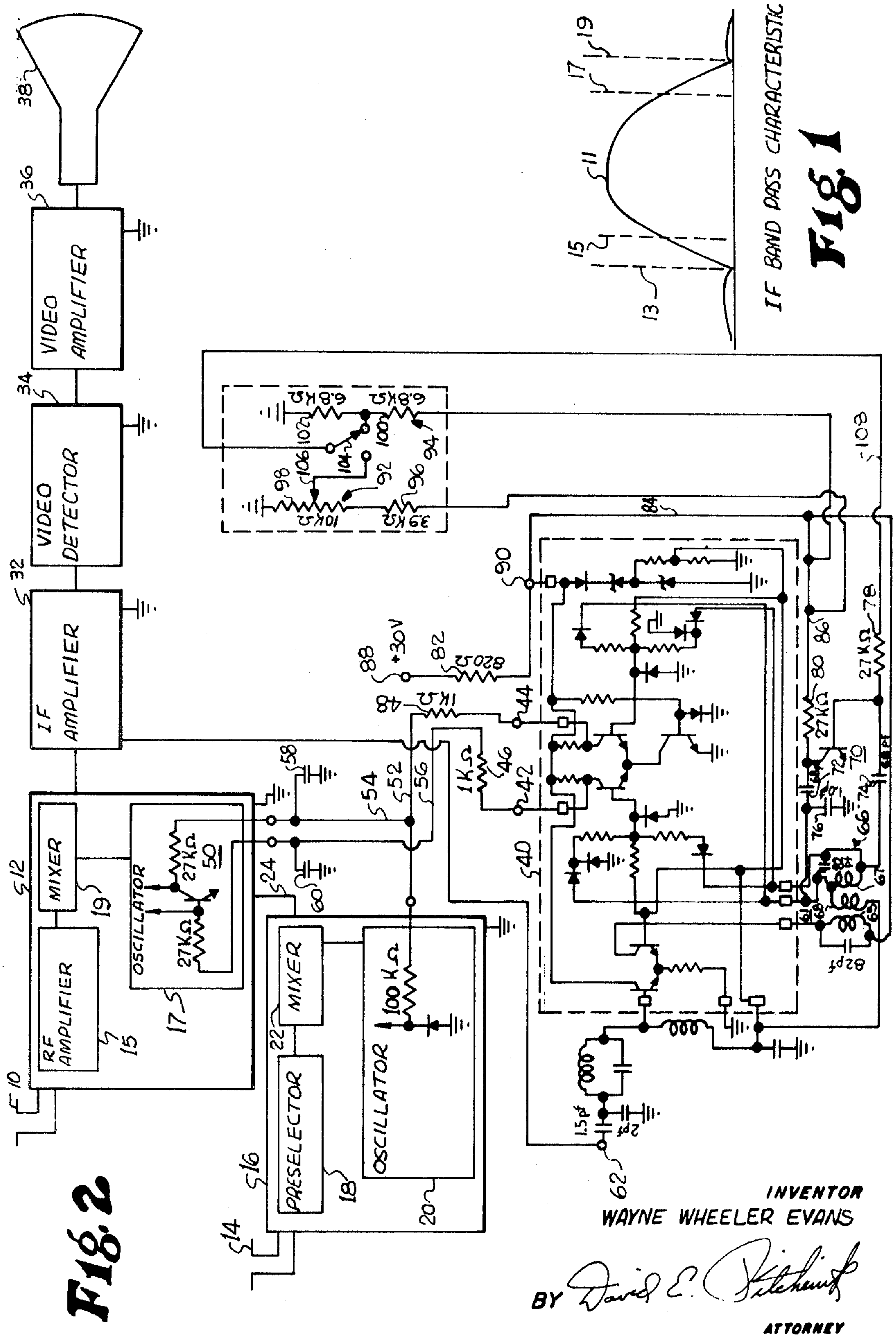

INVENTOR
WAYNE WHEELER EVANS

BY David E. Pitchenik
ATTORNEY

AUTOMATIC FREQUENCY CONTROL SYSTEM

The present invention relates to the automatic control of the tuning of a television receiver, and more particularly, to an automatic frequency control system for the local oscillator of a superheterodyne television receiver.

In addition to channel selection mechanisms, many television receivers have a fine-tuning control to provide the user with a more precise frequency control over the local heterodyne oscillator. Generally, in order to provide the optimum image on the television screen, together with the optimum sound, it is necessary that the receiver local oscillator be adjusted so that the picture and sound carriers are located at the correct point in the intermediate frequency (IF) pass band of the television receiver. This is especially true in the tuning of color television receivers. Not only must the picture and sound carriers be situated at their proper positions in the IF pass band, but also the color subcarrier must be properly positioned in the pass band in order that the colors will be reproduced on the face of the kinescope with proper hue and saturation characteristics. Since it is desirable that the operator of a television receiver be freed, as much as possible, of the requirement of making any fine-tuning adjustment of the local oscillator, automatic frequency control systems have been provided for the local heterodyne oscillator.

Unfortunately, conditions occasionally occur where it is desirable to change the tuning of the local oscillator in the heterodyne receiver to change the position in the television receiver pass band of the video and sound carriers, as well as the color subcarrier. Consequently, many television receivers which include an automatic frequency control system for the local oscillator have included a switch to turn off the frequency control system. The user, when conditions warrant, may turn off or disable the automatic frequency control system and thereafter manually readjust the fine-tuning control such that the optimum picture and sound are produced by the television receiver. With the advent of electronic and signal-seeking tuning, however, no fine-tuning control may be available to the user for a manual adjustment of the local oscillator frequency.

In a television receiver of the type that includes an oscillator stage for generating a local signal to be heterodyned with a radiofrequency signal in a mixer stage, a system embodying the present invention includes a voltage-responsive variable capacitance device coupled to the oscillator stage providing the only means for fine-tuning adjustments of the oscillator signal frequency. An automatic frequency control means has a resonant circuit including control means to tune the resonant circuit to different frequencies within a band of frequencies. The control means provides an output control voltage having a magnitude determined by the frequency deviation of the output signal from the mixer stage from the resonant frequency of the resonant circuit.

A complete understanding of the invention may be obtained from the following detailed description thereof when taken in conjunction with the drawing, in which:

FIG. 1 is a curve illustrating a television receiver intermediate frequency band-pass characteristic and the position of certain signal carriers with respect to the pass band curve; and FIG. 2 is a schematic circuit diagram, partly in block form, of an automatic frequency control system embodying the present invention.

Referring now to FIG. 1, there is shown an intermediate frequency pass band characteristic 11 for a television receiver. The particular pass band curve shown is that of the CTC-40 series chassis as it appears at the output terminal of the television receiver intermediate frequency amplifier before application to the video detector stage. The CTC-40 series chassis is shown in the publication "Television Service Data," File 1968, No. T20, prepared by the RCA Sales Corporation, 600 North Sherman Drive, Indianapolis, Ind. 46206. Superimposed on the IF band pass curve 11 are several signal carriers associated with intermediate frequency color television signals. A sound carrier signal 13 is located at 41.25 MHz. and a color subcarrier signal 15 is located approximately halfway up the positive slope of the intermediate frequency curve 11 at 42.17 MHz. A video carrier signal 17 is located approximately halfway down the negative slope of the intermediate frequency curve 11 at 45.75 MHz. The adjacent channel intermediate frequency sound carrier signal 19 is located at 47.25 MHz. The adjacent channel sound carrier 19 is the intermediate frequency signal sound carrier of a television signal located adjacent to the desired television signal in the television frequency band and produced by the heterodyning action between the adjacent television signal sound carrier and the local heterodyne oscillator signal.

The intermediate frequency amplifier stage band pass is designed such that certain signals are amplified more than others, as is reflected in the band-pass curve 11. In particular, the intermediate frequency amplifier provides minimum amplification of the sound carrier 13 and adjacent sound carrier 19. This is done to minimize the sound carrier amplitude and thereby minimize sound carrier signal detected by the television video detector and thereafter applied to the kinescope. Where the sound carrier signals are sufficiently strong, their detection and application to the kinescope will produce an observable beat pattern on the face of the kinescope.

Conditions occasionally arise where one or more signals carriers of the television signal are transmitted at improper frequencies. Consequently when the transmitted signals are heterodyned in the television receiver with the local oscillator signals, an intermediate frequency signal is produced with the intermediate frequency signal located at improper frequencies. These conditions may occur when the television signal is originally generated or when the generated television signal is reheterodyned, as for example, to produce a signal to be transmitted via a cable link. Generally, the frequency deviations are quite small, even within the tolerance of government regulation; however, the frequency deviation may be sufficient to cause a less than optimum picture to be produced on the face of the kinescope. The frequency errors often arise from the particular characteristics of the equipment used to generate or reheterodyne the television signal and are, therefore, of a permanent nature.

One particular troublesome condition occurs where the intermediate frequency adjacent channel sound carrier is a strong signal with respect to the desired intermediate frequency video carrier signal and the adjacent channel sound carrier signal is improperly positioned, being located below 47.25 MHz. The adjacent channel sound carrier will be amplified in the intermediate frequency amplifier because of its improper position with respect to the amplifier band pass. Under such conditions, the adjacent channel sound carrier signal will be a strong signal and when detected by the television video detector and applied to the kinescope, will produce an observable beat pattern on the face of the kinescope.

A similar problem arises when the television receiver intermediate frequency amplifier is misaligned. Specifically, where the intermediate frequency adjacent channel sound carrier is amplified due to a misalignment of filter circuits in the intermediate frequency amplifier, designed to attenuate the amplitude of 45.75 MHz. signals. Where this occurs a strong intermediate frequency adjacent channel sound carrier signal may be detected by the video detector and, as previously described, cause an observable beat pattern to be produced on the face of the kinescope.

Another improper signal condition that may arise in the generation of television signals is an amplitude difference between the intermediate frequency color subcarrier signal of the several television signals in the television frequency band. Where the amplitude of a particular television signal color subcarrier signal is low relative to other television subcarrier signals, the user of the television receiver is required to adjust the receiver chroma control to provide additional amplification of the particular intermediate frequency color subcarrier signal each time the user tunes to the particular television signal. The problem of a low-amplitude color subcarrier can also be minimized by adjusting the heterodyne oscillator frequency such that the intermediate frequency color subcarrier signal is moved to a point in the intermediate frequency band pass where additional amplification is provided. Specifically, the heterodyne oscillator can be adjusted such that the intermediate frequency color subcarrier signal produced is located above 42.17 MHz., higher on the positive sloped portion of the band-pass curve 11. The automatic chroma control circuitry of the television chassis adjusts the gain of the television receiver chroma amplifiers to maintain the intermediate frequency color subcarrier signal level of the other television signals substantially constant. This offsets the additional amplification of other intermediate frequency color subcarrier signals caused by their repositioning in the intermediate amplifier band pass due to the adjustment of the local oscillator frequency.

From the foregoing it is evident that it is highly desirable, under certain conditions, to provide means for repositioning the intermediate frequency signal carriers with respect to the intermediate frequency band pass. The repositioning means should permit an adjustment of the local heterodyne oscillator frequency to optimize the picture produced on the face of the kinescope. As was previously indicated, in prior television receivers, this adjustment may be obtained by turning off or disabling the automatic frequency control system (on those television receivers having frequency control systems) and manually readjusting the television fine-tuning control.

Referring now to FIG. 2, a television receiver, a portion of which is shown, is coupled to an antenna 10 for intercepting television signals in the VHF band which are applied to a VHF tuner 12, and an antenna 14 for intercepting television signals in the UHF band which are applied to a UHF tuner 16. The tuner 12 includes an RF amplifier 15 and a local oscillator 17 for generating heterodyning signals. Both the RF amplifier 15 and the local oscillator 17 are coupled to a mixer circuit 19 which mixes the received VHF television signals and the locally generated signals to provide a correspondingly modulated signal of intermediate frequency.

The tuner 16 includes a resonant UHF preselector 18 and a local oscillator 20 for generating heterodyning signals. The preselector 18 and the local oscillator 20 are coupled to a mixer circuit 22 which mixes the received UHF television signal and the locally generated signals to provide an intermediate frequency output signal. The UHF intermediate frequency signals are applied to the VHF tuner 12 via a lead 24. During UHF operation the VHF RF amplifier 15 and the mixer 19 provide amplification of the UHF IF signal. The amplified UHF IF signal or the VHF IF signals, as the case may be, are amplified in the intermediate frequency amplifier 32 and thereafter applied to a video detector 34. The composite video signal output from the detector 34 includes a video signal which is amplified by a video amplifier 36 and applied to a picture tube 38.

Automatic fine-tuning circuits 40 are coupled between the IF amplifier 32 and both the VHF tuner 12 and the UHF tuner 16. The automatic fine-tuning circuits are of the type used in the CTC-40 chassis, supra, and are described in a U.S. Pat. granted to Jack Avins, U.S. Pat. No. 3,444,477. The automatic fine-tuning crossover frequency is normally adjusted to 45.75 MHz., the frequency of a properly tuned intermediate frequency video carrier signal. The circuits 40 produce a differential DC voltage output signal at the terminals 42 and 44. The differential voltage is proportional to the frequency of an applied signal which is within the AFT pull-in range. That is, the difference between the output voltages (or differential) represents the amount and direction of frequency deviation of the applied signal from the center frequency of the discriminator circuits of the automatic fine-tuning circuitry. If the detected signal is exactly at the center frequency (normally tuned to 45.75 MHz.) each automatic fine-tuning circuit output terminal voltage is +6.5 volts. As the incoming signal deviates from the discriminator center frequency, one output terminal voltage increases and the other decreases an equal amount. The voltage at each terminal will increase or decrease depending on the direction the applied signal frequency deviates from the discriminator center frequency.

The automatic fine-tuning circuit output voltages at the terminals 42 and 44 are applied via the resistors 46 and 48 to a voltage-responsive variable capacitance device in each of the tuners 12 and 16. The resistors 46 and 48 provide protection against possible kinescope arcs in the television receiver. The adjusted capacitance of the variable capacitance devices regulate the oscillator resonant frequency to compensate for any detuning of the signal detected by the automatic fine-tuning circuit 40 from the center frequency of the discriminator. Specifically, the voltage at the terminal 44 is applied to a variable capacitance device 50 connected in the tunable resonant circuit of the oscillator 17 via the resistor 48, the lead 52, and the lead 54. The output voltage at the terminal 42 is applied to the device 50 via the resistor 46 and the lead 56. Two capacitors 58 and 60 are connected to the leads 54 and 56, respectively. The capacitors provide filtering of any AC voltages which may develop and adversely affect the operation of the oscillator by varying the voltage across the variable capacitance device.

The automatic fine-tuning circuit 40 has intermediate frequency signals developed in the television receiver applied at an input terminal 62. The terminal 62 may conveniently be connected to the collector electrode of the third pix IF (Q304) in the CTC-40 series chassis, supra. The automatic fine-tuning circuit 40 includes a phase shift discriminator transformer 61 which is normally tuned to the 45.75 MHz. intermediate frequency video carrier signal frequency. The discriminator 61 has a primary winding 65 and a secondary winding 67. A tertiary winding 68 is connected to a center tap of the secondary winding 67 and inductively coupled to the primary winding 65. A voltage-responsive variable capacitance device 70 is coupled to the discriminator secondary winding 67 by the capacitors 72 and 74. A capacitor 76 is coupled between the capacitor 72 and a point of reference potential, shown as ground, to compensate for capacitive unbalance which may be introduced by the physical position of the circuit components.

A voltage is applied across the variable capacitance device 70 via the resistors 78 and 80. The voltage applied to the resistor 80 is obtained from a source of potential applied to terminal 88 via the resistor 82, the lead 84 and the lead 86. The junction of the resistor 82 and lead 84 is coupled to a terminal 90 associated with the automatic fine-tuning circuit 40 and is held at a regulated voltage of +11 volts by circuitry in the automatic fine-tuning system. The voltage developed at the terminal 90 is applied across two parallel resistor strings 92 and 94. The resistor string 92 includes a resistor 96 connected in series with a resistor 98 having an adjustable tap connection 106. The resistor string 94 includes the resistors 100 and 102.

A switch 104 is selectively connected to the junction of the resistors 100 and 102 and the tap 106. Thus, a fixed voltage may be applied to the resistor 78 via the lead 108 when the switch 104 is in a first position and a variable voltage can be applied to the resistor 78 when the switch 104 is in its second position. When the switch 104 is in its first position, the voltage developed across the variable capacitance device 70 causes the device to provide a capacity such that the discriminator circuit 61 is tuned to a center frequency of 45.75 MHz., the intermediate frequency video carrier signal frequency. When the switch 104 is in its second position a voltage ranging from approximately 2 to 11 volts may be impressed across the variable capacitance device 70, depending upon the setting of the tap connection 106. When the tap 106 is positioned at the grounded end of the resistor 98, +11 volts will be impressed across the device 70. It should be noted that the voltages are such that the collector-base junction of the device 70 is reverse biased and limits the current flow through the device to a minority carrier current. Consequently, a very small amount of voltage is dropped across the resistors in series with the device collector-base junction and coupled between the terminal 90 and ground. The switch 104 and the adjustable tap 106 may be mounted in a position remote from the automatic fine-tuning circuit 40 for easy accessibility.

As the voltage impressed across the voltage-responsive variable capacitance device 70 ranges from 2 volts to 11 volts, the capacitance varies by approximately 4 picofarads. This capacitance variation is capable of varying the resonant frequency of the discriminator 61 approximately 200 kHz. above and below the center frequency of 45.75 MHz. Adjusting the capacitance of the voltage-responsive variable capacitance device 70 allows the crossover frequency of the automatic fine-tuning circuit 40 to be changed to adjust the heterodyne oscillator frequency to compensate for the conditions previously mentioned. The frequency adjustment of the discriminator resonant circuit should generally be kept within a frequency band of 500 kHz., 250 kHz. above and below the discriminator's normal center frequency of 45.75 MHz. This permits a sufficient frequency adjustment to compensate for the previously mentioned conditions, yet not so great an adjustment as to permit the user to cause a seriously degraded picture to appear on the face of the kinescope by detuning those intermediate frequency signal carriers which are properly positioned with respect to the intermediate frequency pass band.

It is essential that the resonant frequency of the discriminator 61 not vary. Should the resonant frequency drift with temperature change, the crossover frequency of the automatic fine-tuning circuit 40 will change and will improperly adjust the heterodyne oscillator to track with the change in resonant frequency of the discriminator 61. When the ambient temperature in the television receiver increases, the device 70 becomes heated. Since the device 70 exhibits a positive capacitive temperature coefficient, the discriminator resonant frequency decreases. In order to offset the effect, the capacitors 72 and 74 are selected to have a negative capacitance temperature coefficient to cause the total series capacitance of the capacitors 72 and 74 and the device 70, which are coupled across the discriminator secondary circuit, to remain substantially constant and maintain the discriminator resonant frequency stable when temperature changes occur.

What is claimed is:

1. In a color television receiver of the type including an oscillator stage for generating a local signal to be heterodyned with a radiofrequency signal having color and audio information components in a mixer stage to produce an intermediate frequency output signal having corresponding color and audio information components and also including a shaped intermediate frequency band-pass response, a system comprising:

a voltage-responsive variable capacitance device coupled to said oscillator stage providing the only means for fine-tuning adjustments of the oscillator signal frequency;

automatic frequency control means having a resonant circuit for providing an output control voltage having a magnitude determined by the frequency deviation of the output signal from said mixer stage from the resonant frequency of said resonant circuit, said automatic frequency control means coupled to said variable capacitance device in a manner such that whenever said television receiver is in use, the capacitance exhibited by said device is controlled by said output control voltage;

said resonant circuit including control means to tune said circuit to different frequencies within a band of frequencies by varying the capacitance of a voltage-responsive variable capacitance device operably connected in said resonant circuit; and first means for applying a voltage across said control means variable capacitance device including means for applying a preset voltage across said control means variable capacitance device to cause said resonant circuit to be tuned to a predetermined frequency within said band of frequencies during normal operation of said television receiver such that the intermediate frequency output signal color and audio information components are at a nominal position with respect to the television receiver shaped intermediate frequency band-pass response and means for applying a variable voltage across said control means variable capacitance device to vary the capacitance exhibited by said variable capacitance device to tune said resonant circuit across said band of frequencies during those conditions when it is desirable to shift the intermediate frequency output signal color and audio information components from the nominal position to a new position with respect to the television receiver shaped intermediate frequency band-pass response to obtain a more optimum combination of reproduced color and sound by said television receiver.

2. A system as defined in claim 1 wherein said preset voltage when applied across said control means variable capacitance device, tunes said tunable resonant circuit to 45.75 MHz.

3. A system as defined in claim 2 wherein said first means comprises a voltage divider circuit with at least one tap point, a potentiometer with a movable contact, and switch means coupled to said control means variable capacitance device and switchable between said tap point for applying said preset voltage across said control means variable capacitance device and said movable contact for applying said variable voltage across said control means variable capacitance device.

4. A system as defined in claim 1 wherein said variable voltage is limited to a predetermined range such that said tunable resonant circuit band of frequencies is limited to no greater than 500 kHz.

5. A system as defined in claim 4 wherein said preset voltage when applied across said variable capacitance device, tunes said tunable resonant circuit to 45.75 MHz.

* * * * *